(12) United States Patent
Garza et al.

(10) Patent No.: US 8,725,708 B2
(45) Date of Patent: May 13, 2014

(54) RESOLVING A UNIT OF WORK

(75) Inventors: Jose Emir Garza, Richmond (GB); Stephen James Hobson, Middlesex (GB); Steven Powell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 11/690,317

(22) Filed: Mar. 23, 2007

(65) Prior Publication Data

US 2008/0040729 A1   Feb. 14, 2008

(30) Foreign Application Priority Data

Mar. 29, 2006 (GB) .................................. 0606226.9

(51) Int. Cl.
  *G06F 7/00* (2006.01)
  *G06F 17/00* (2006.01)
(52) U.S. Cl.
  USPC ......................................................... 707/703
(58) Field of Classification Search
  USPC ...................................... 707/8, 999.008, 703
  See application file for complete search history.

(56) References Cited

U.S. PATENT DOCUMENTS

| | | | |
|---|---|---|---|
| 5,261,089 A * | 11/1993 | Coleman et al. ........................ | 1/1 |
| 6,349,310 B1 * | 2/2002 | Klein et al. .................... | 707/703 |
| 6,490,595 B1 * | 12/2002 | Candee et al. ................ | 707/202 |
| 6,842,763 B2 | 1/2005 | Kettley | |
| 7,103,597 B2 * | 9/2006 | McGoveran ....................... | 707/8 |
| 7,526,670 B2 * | 4/2009 | Lloyd et al. ..................... | 714/4.1 |
| 7,584,454 B1 * | 9/2009 | Massoudi ....................... | 717/121 |
| 7,661,106 B1 * | 2/2010 | Ankireddipally et al. .... | 718/101 |
| 2002/0116205 A1 * | 8/2002 | Ankireddipally et al. ........ | 705/1 |
| 2004/0139166 A1 * | 7/2004 | Collison ........................ | 709/207 |
| 2005/0021836 A1 * | 1/2005 | Reed et al. ..................... | 709/238 |
| 2005/0096928 A1 * | 5/2005 | Ruggaber et al. ................. | 705/1 |
| 2005/0208941 A1 * | 9/2005 | Ordille et al. .............. | 455/435.1 |
| 2007/0226277 A1 * | 9/2007 | Holenstein et al. ........... | 707/204 |

OTHER PUBLICATIONS

Patrick Eugster et al, "The Many Faces of Publish/Subscribe", 2003, ACM Computing Surveys, vol. 35.*
Prasun Dewan, "Nested Transactions", Apr. 7, 1999. Available online: http://www.cs.unc.edu/~dewan/242/s99/notes/trans/node9.html.*
Eugster et al, "The Many Faces of Publish/Subscribe", 2003, ACM Computing Surveys, vol. 25, No. 2, pp. 114-131.*
Eli Fidler, "PADRES: A Distributed Content-Based Publish/Subscribe System", 2006.*
Arvola Chan, "Transactional Publish/Subscribe: The Proactive Multicast of Database Changes", 1998, ACM.*
Weikum et al, "Concepts and Applications of Multilevel Transactions and Open Nested Transactions", 1992.*

* cited by examiner

*Primary Examiner* — Brannon W Smith
(74) *Attorney, Agent, or Firm* — Lee Law, PLLC; Christopher B. Lee (57) ABSTRACT

A method for resolving a unit of work involving a plurality of participants, for use in a publish/subscribe system having a plurality of participants that subscribe to a first topic and at least one component having access to an outcome associated with the unit of work. The component publishes, to the first topic, a first message comprising a first outcome associated with the unit of work. If there is a failure associated with a first participant, a second participant use the published outcome to recover the unit of work.

21 Claims, 7 Drawing Sheets

RESOLVING A UNIT OF WORK

FIELD OF THE INVENTION

The present invention relates to a method for resolving a unit of work.

BACKGROUND OF THE INVENTION

In the field of transaction processing, units of work are generally required to have what are known as the ACID properties. ACID is an acronym representing the four unit of work properties of: Atomicity, Consistency, isolation and Durability. Atomicity requires that either all the operations of the unit of work must be seen to occur or none must be seen to occur. Consistency requires a unit of work to maintain the consistency of the data on which it operates. Isolation requires a unit of work not to read the intermediate results of another transaction. Durability requires the results of a committed unit of work to be made permanent and that the other ACID attributes can be guaranteed even in the event of system failure.

Figure 1:
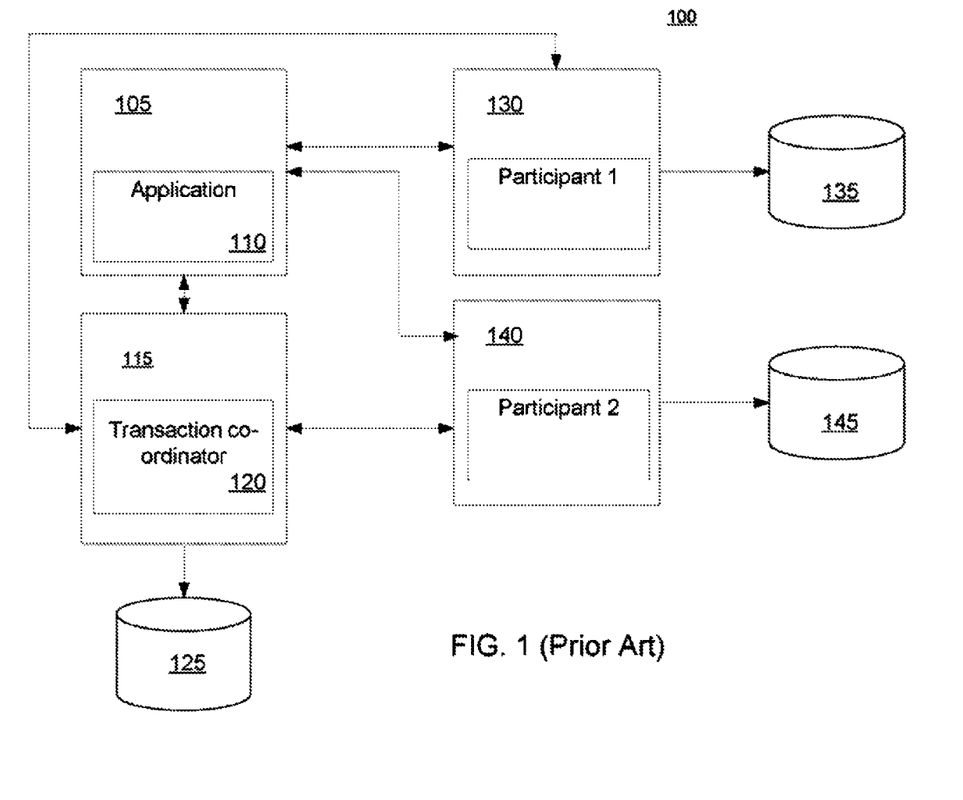
FIG. 1 is a block diagram of a prior art transactional system.

FIG. 1 is a block diagram of a prior art transactional system (300) having a first data processing system (105) comprises an owning application (110) and a second data processing system (115) comprising a transaction co-ordinator (120) for executing transactions and managing a resource, such as a database (125). There is also shown a third data processing system (130) comprising a first participant (131) for managing a first resource (e.g. a database 135). There is also shown a fourth data processing system (140) comprising a second participant (141) for managing a second resource (e.g. a database 145). The databases are used to store plurality of logs to which the transaction co-ordinator (120), the first participant and the second participant can respectively write one or more log records (i.e. wherein a log record comprises data associated with a transaction). It should be understood that components involved in a transaction (i.e. the owning application (110), the transaction co-ordinator (120), Participant 1 and Participant 2) can reside on any data processing system and that the components can all reside on the same data processing system.

The data can be used to facilitate recovery in the event of failure associated with a system on which the transaction co-ordinator and/or a participant are executing. It will be appreciated that such a failure may relate to a loss of power or the failure of a hardware device such as onboard memory or a DASD holding a database.

In order to provide this functionality it is necessary for the transaction co-ordinator to maintain a non-volatile log which survives a system failure and which records the progress of each transaction. For example the transaction co-ordinator will maintain in the log progressive states of the transaction. At certain points in the transaction the transaction must be held while the transaction co-ordinator ensures that a log record has been written to non-volatile storage.

If a participant fails, the participant may need to be re-started in order to advance a transaction. It will be appreciated that the lapsed time taken to complete a restart is important to any business.

SUMMARY OF THE INVENTION

According to a first aspect the present invention provides a method for resolving a unit of work involving a plurality of participants, for use in a publish/subscribe system, the method comprising the steps of: subscribing to a first topic, by the plurality of participants and at least one component having access to an outcome associated with the unit of work; publishing to the first topic, by the at least one component, a first message comprising a first outcome associated with the unit of work; and in response to a failure associated with a first participant, using, by a second participant, the published outcome to recover the unit of work.

According to a second aspect the present invention provides a system for resolving a unit of work involving a plurality of participants, for use in a publish/subscribe system, the system comprising: means for subscribing to a first topic, by the plurality of participants and at least one component having access to an outcome associated with the unit of work; means for publishing to the first topic, by the at least one component, a first message comprising a first outcome associated with the unit of work; and in response to a failure associated with a first participant, means for using, by a second participant, the published outcome to recover the unit of work.

According to a third aspect, the present invention provides a participant for resolving a unit of work involving a plurality of participants, for use in a publish/subscribe system, wherein at least one component has access to an outcome associated with the unit of work, the at least one component comprising means for subscribing to a first topic and means for publishing to the first topic a first message comprising a first outcome associated with the unit of work, the participant comprising: means for subscribing to the first topic; and in response to a failure associated with a further participant, means for using, the published outcome to recover the unit of work.

According to a fourth aspect, the present invention provides a component for resolving a unit of work involving a plurality of participants, for use in a publish/subscribe system, the component having access to an outcome associated with the unit of work, comprising: means for subscribing to a first topic; means for publishing to the first, topic a first message comprising a first outcome associated with the unit of work.

According to a fifth aspect, the present invention is embodied as a computer program product comprising a computer usable medium having computer program code adapted to perform all the steps of the method described above when said program is run on a computer.

Alternatively, a participant subscribes to a first topic and a co-ordinator subscribes to a second topic. The participant publishes a request for an outcome to the second topic and the co-ordinator publishes an outcome to the first topic.

BRIEF DESCRIPTION OF THE DRAWINGS

The present invention will now be described, by way of example only, with reference to preferred embodiments thereof as illustrated in the following drawings.

DETAILED DESCRIPTION OF THE PREFERRED EMBODIMENTS

Figure 2:
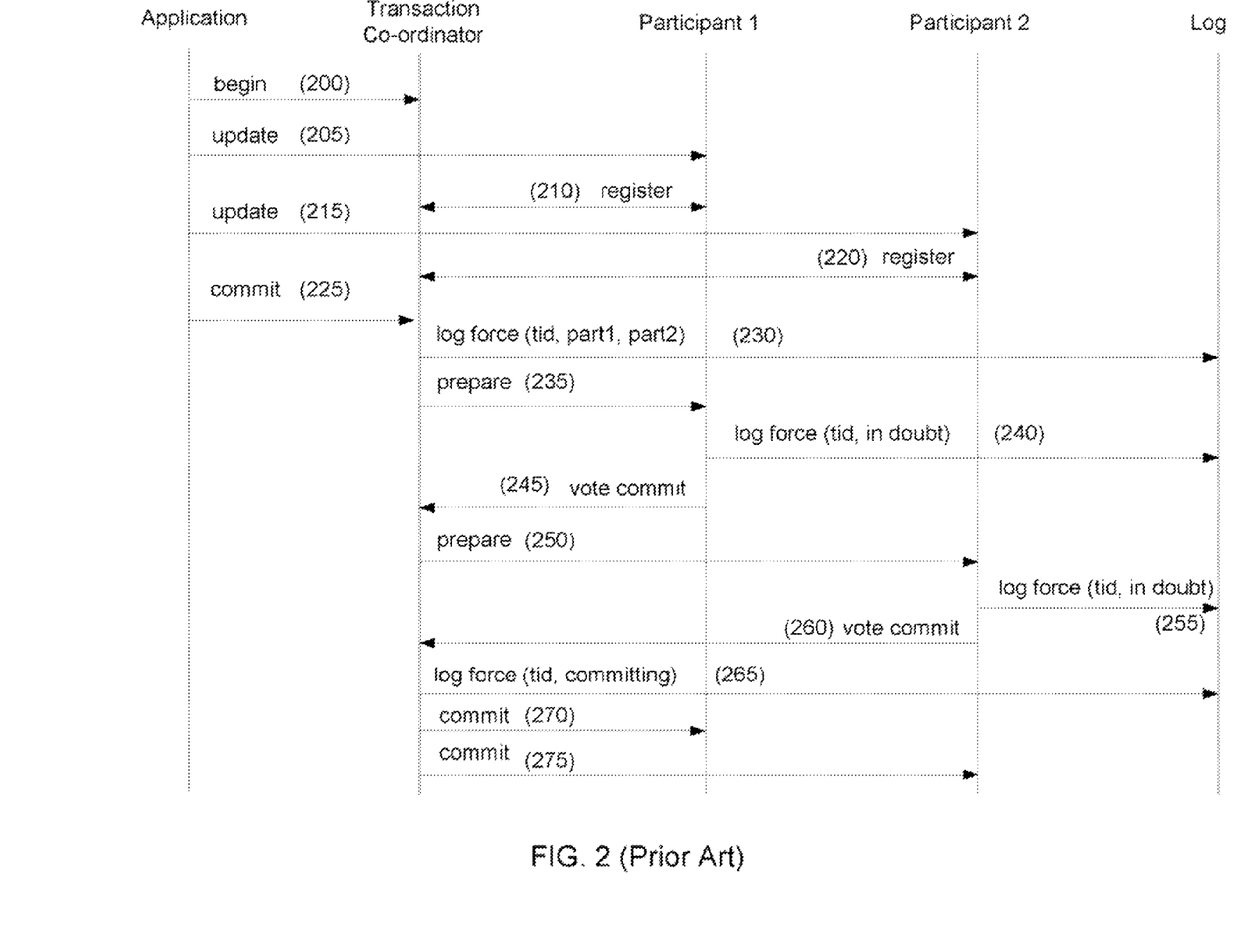
FIG. 2 is a schematic diagram of the components involved in a prior art transaction and the flows between those components.

According to the preferred embodiments, the chosen unit of work is a transaction. FIG. 2 is a schematic diagram of the components involved in an example of a prior art transaction and the flows involved between the components according to a two phase commit protocol. Firstly, the application (110) flows a begin request (200) to the transaction co-ordinator (120), winch indicates the start of a transaction. Next, the application (110) sends an update request (205) (that is, a request that makes a change to a participant) to Participant 1. In response to receiving the update request. Participant 1 registers (210) as a participant in the transaction with the transaction co-ordinator (120) and receives a transaction identifier of the transaction as part of the registration process. Next, the application sends an update request (215) to Participant 2. In response to receiving the update request. Participant 2 registers (220) as a participant in the transaction with the transaction co-ordinator (120) and receives a transaction identifier of the transaction as part of the registration process.

In response to Participant 1 and Participant 2 successfully performing the update requests, the application (110) sends a commit request (225) to the transaction co-ordinator (120). The application (110) does not regain control until commit processing completes.

In response to the commit request (225) from the application (110), the transaction co-ordinator (120) force writes (230) a first log record to the log (125), wherein the first log record comprises an identifier associated with the transaction, an identifier associated with Participant 1 and an identifier associated with Participant 2. Participant 1 does not have data associated with Participant 2 and vice versa. Thus, only the transaction co-ordinator has data associated with participants in a transaction. Note that a forced write does not return until the data, written is hardened to non-volatile storage.

Next, once the forced log write completes (guaranteeing the data is stored in non-volatile storage), the transaction co-ordinator (120) flows a prepare request (235) to Participant 1. It should be understood that a participant, after being involved in the transaction, assumes rollback until it receives a prepare request, in other words if the participant chooses to take unilateral action for the transaction, after being involved in a transaction and before receiving a prepare request it should rollback updates associated with the transaction.

In response to receiving the prepare request, Participant 1 force writes (240) a second log record to the log, wherein the second log record comprises the transaction identifier received in response to the prepare request and a state associated with the transaction, namely, "in doubt". This state indicates that Participant 1 can no longer assume rollback but needs to wait to be informed of a transaction outcome. Next, Participant 1 flows a commit vote (245) (i.e. a response to the prepare request) to the transaction co-ordinator (120), indicating that Participant 1 can successfully participate in the transaction. It should be understood, that if Participant 1 cannot successfully participate in the transaction, it should back out any updates it performed and vote rollback without writing a log record.

Next, the transaction co-ordinator (120) flows a prepare request (250) to Participant 2. In response to receiving the prepare request, Participant 2 force writes (255) a third log record to the log, wherein the third log record comprises the transaction identifier and a state associated with the transaction, namely, "in doubt". This state indicates that Participant 2 can no longer assume rollback but needs to wait to be informed of the transaction outcome. Next, Participant 2 flows a commit vote (260) (i.e. a response) to the transaction coordinator (120), indicating that Participant 2 can successfully participate in the transaction. It should be understood that, if Participant 2 cannot successfully participate, it should back out any updates it performed and vote rollback without writing a log record.

The transaction co-ordinator (120) collects all votes, but the collected votes are not hardened in the log (125). Next, the transaction co-ordinator (120) force writes (265) a fourth log record to the log, wherein the fourth log record includes the transaction identifier and a computed outcome associated with the transaction. Assuming that all participants voted commit, the decision is commit. If one or more participants vote rollback, the decision is rollback.

Next, the transaction co-ordinator (120) flows a commit request (270) to Participant 1 and a commit request (275) to Participant 2, indicating to the participants that they should commit the transaction. After, the transaction has been committed, the participants "forget" the transaction, resulting in the log records associated with the participants becoming eligible for purging.

It should be understood that the transaction described with reference to FIG. 2 is an example of a two-phase commit transaction. A skilled person will realise that there are many variations possible, for example the transaction may contain any number of participants and further one or more participants may not perform updates.

A preferred embodiment of the invention will now be described as involving cascaded transactions. Resource recovery based on the two-phase commit protocol has two functions: to "commit", wherein all changes to both local and distributed resources are made permanently or to "backout", wherein all pending changes to both local and distributed resources are not made.

The set of changes that are to be made or not made as a unit are called a unit of recovery (UR). A UR represents an application program's changes to resources since the last commit or backout or, for the first UR, since the beginning of the application. Each UR is associated with a context, which consists of the UR or more than one UR with the associated application programs, participants, and protected resources. A context, which is sometimes called a work context, represents a work request.

Distributed transaction support systems are known (e.g. Resource Recovery Services (RRS), a component of z/OS (z/OS is a registered trademark of International Business Machines Corporation)). A cascaded transaction is a type of distributed transaction in which the representation of separate portions of a distributed transaction is combined into a single transaction. In a cascaded transaction, each branch of the distributed transaction is represented by a unit of recovery (UR), each with its work context. Co-ordination between the units of recovery is controlled (e.g. by RRS).

A cascaded UR family is created when a participant notifies RRS to create a new UR from an existing UR. Typically, a participant creates a cascaded UR when a single work request involves multiple participants. The participant running in the environment in which the transaction was first originated obtains the initial work contest that represents the work request and notifies RRS to create a UR for the work request. When the work request is moved from the execution environment, of the original participant into another participant's environment, the second participant obtains a new work context and notifies RRS to create a new UR. This newly created UR is then cascaded from the original UR for the new work context.

The UR representing the original work request is called a parent UR (top-level UR). The new UR is a child UR (cascaded UR) of the parent UR. This UR set is coordinated by RRS as a single transaction within a single commit scope. The changes made by all of the participants in a UR family are either all committed or all backed out.

It should be understood that since a cascaded transaction can cross multiple systems, a child UR may reside on a different system from that of the parent UR. In RRS terminology, the system where the top-level UR resides is called the coordinator and the system where a child UR resides is called a subordinate.

Figure 3:
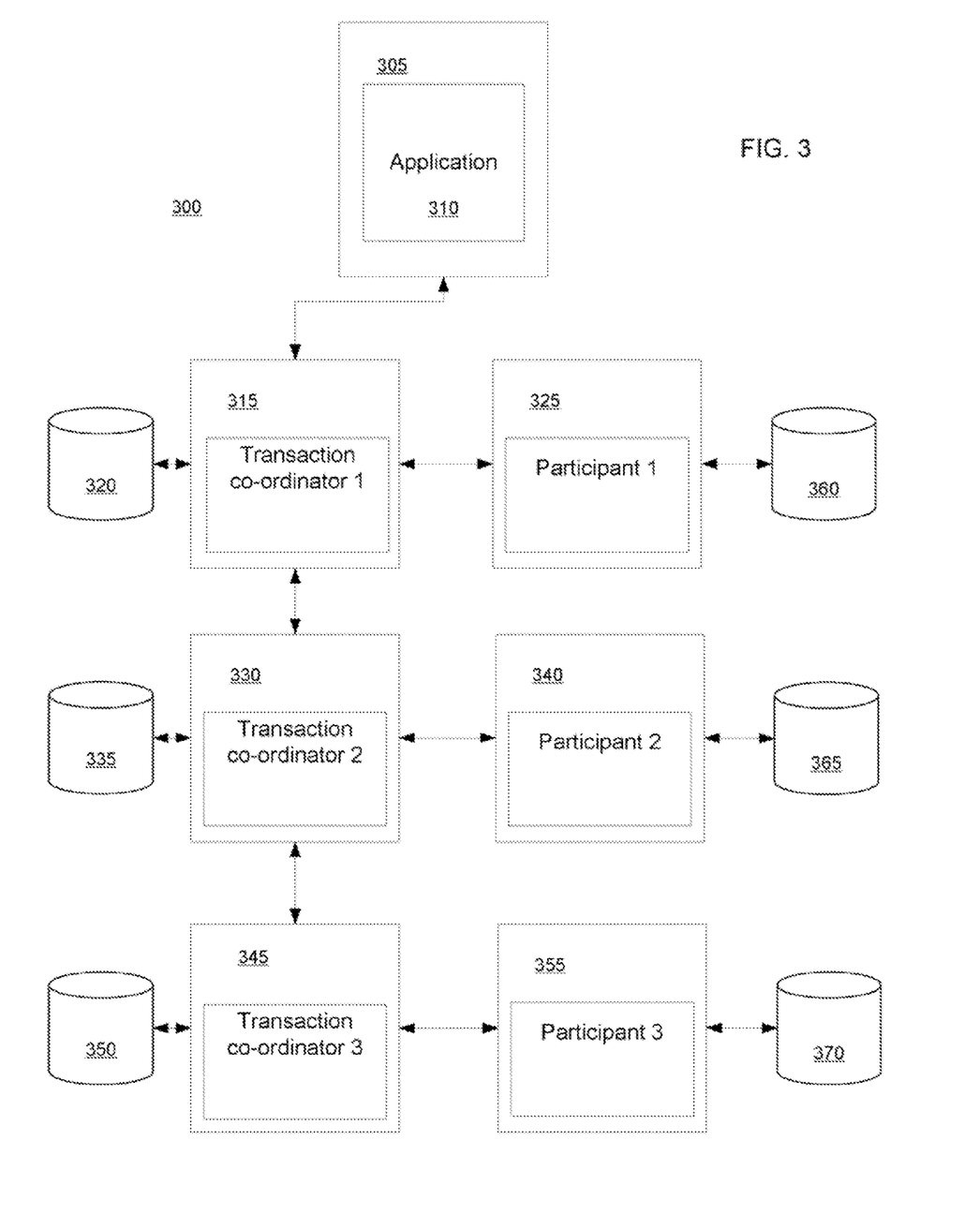
FIG. 3 is a block diagram of a transactional system according to a first embodiment.

FIG. 3 is a block diagram of a transactional system (300) comprising components involved in a cascaded transaction. In FIG. 3 there is shown an owning application (310) running on a data processing system (305). There is also shown Transaction Co-ordinator 1 running on a data processing system (315). Transaction Co-ordinator 1 is a system on which the top level UR resides and is termed herein as a co-ordinator. Transaction Co-ordinator 1 has an associated log (320). Transaction Co-ordinator 1 communicates with Participant 1 which runs on a data processing system (325). Participant 1 has an associated tog (360).

Transaction Co-ordinator 1 also communicates with Transaction Co-ordinator 2 which rims on a data processing system (330). Transaction Co-ordinator 2 is a system on which a child UR resides and is termed herein as a subordinate. Transaction Co-ordinator 2 has an associated, log (335). Transaction Co-ordinator 2 communicates with Participant 2 which runs on a data processing system (340). Participant 2 has an associated log (365).

Transaction Co-ordinator 2 also communicates with Transaction Co-ordinator 3 which runs on a data processing system (345). Transaction Co-ordinator 3 is a system on which a child UR resides and is termed herein as a subordinate. Transaction Co-ordinator 3 has an associated log (350). Transaction Co-ordinator 3 communicates with Participant 3 which runs on a data processing system (355). Participant 3 has an associated log (370).

Firstly, the application (310) flows a begin request to Transaction Co-ordinator 1 which indicates the start of a transaction. Next, the application (310) sends an update request to Participant 1. In response to receiving the update request. Participant 1 registers as a participant in the transaction with Transaction Co-ordinator 1 and receives a transaction identifier (e.g., T1) of the transaction in response.

Next, the application (310) sends an update request to Participant 2. In response to receiving the update request. Participant 2 registers as a participant in the transaction with Transaction Co-ordinator 2 and receives the transaction identifier (T1) of the transaction in response.

Next, the application (310) sends an update request to Participant 3. In response to receiving the update request. Participant 3 registers as a participant in the transaction with Transaction Co-ordinator 3 and receives the transaction identifier (T1) of the transaction in response.

In response to Participant 1, Participant 2 and Participant 3 successfully performing the update requests, the application (310) sends a commit request to Transaction Co-ordinator 1. The application (310) does not regain control until commit processing completes.

In response to the commit request from the application (310), Transaction Co-ordinator 1 force writes a first log record to its log (320), wherein the first log record comprises an identifier associated with the transaction (T1), an identifier associated with Participant 1 and an identifier associated with Transaction Co-ordinator 2.

Next, once the forced log write completes (guaranteeing the data is stored in non-volatile storage). Transaction Co-ordinator 1 flows a prepare request to Participant 1. In response to receiving the prepare request, Participant 1 force writes a second log record to its log (360), wherein the second log record comprises the transaction identifier (T1) received in response to the prepare request and a state associated with the transaction, namely, "in doubt". This state indicates that Participant 1 can no longer assume rollback but needs to wait to be informed of a transaction outcome.

Next, Participant 1 flows a commit vote (i.e. a response to the prepare request) to Transaction Co-ordinator 1, indicating that Participant 1 can successfully participate in the transaction. It should be understood, that if Participant 1 cannot successfully participate in the transaction, it should back out any updates it performed and vote rollback without writing a log record.

Next, Transaction Co-ordinator 1 Rows a prepare request to Transaction Co-ordinator 2. In response to receiving the prepare request, Transaction Co-ordinator 2 force writes a third log record to its log (335), wherein the third log record comprises the transaction identifier (T1), an identifier associated with Participant 2, an identifier associated with Transaction Co-ordinator 1 and an identifier associated Transaction Co-ordinator 3.

Next, once the forced log write completes (guaranteeing the data is stored in non-volatile storage). Transaction Co-ordinator 2 flows a prepare request to Participant 2. In response to receiving the prepare request, Participant 2 force writes a fourth log record to its log (365), wherein the fourth log record comprises the transaction identifier (T1) received in response to the prepare request and a state associated with the transaction, namely, "in doubt". This state indicates that Participant 2 can no longer assume rollback but needs to wait to be informed of a transaction outcome.

Next, Participant 2 flows a commit vote (i.e. a response to the prepare request) to Transaction Co-ordinator 2, indicating that Participant 2 can successfully participate in the transaction. It should be understood, that if Participant 2 cannot successfully participate in the transaction, it should back out any updates it performed and vote rollback without writing a log record.

Next, Transaction Co-ordinator 2 flows a prepare request to Transaction Co-ordinator 3. In response to receiving the prepare request, Transaction Co-ordinator 3 force writes a fifth log record to its log (350), wherein the fifth log record comprises the transaction identifier (T1), an identifier associated with Participant 3 and an identifier associated with Transaction Co-ordinator 2.

Next, once the forced log write completes (guaranteeing the data is stored in non-volatile storage). Transaction Co-ordinator 3 flows a prepare request to Participant 3. In response to receiving the prepare request, Participant 3 force writes a sixth log record to its log (370), wherein the sixth log record comprises the transaction identifier (T1) received in response to the prepare request and a state associated with the transaction, namely, "in doubt". This state indicates that Participant 3 can no longer assume rollback but needs to wait to be informed of a transaction outcome.

Next, Participant 3 flows a commit vote (i.e. a response to the prepare request) to Transaction Co-ordinator 3, indicating that Participant 3 can successfully participate in the transaction. It should be understood, that if Participant 3 cannot successfully participate in the transaction, it should back out any updates it performed and vote rollback without writing a log record.

Transaction Co-ordinator 3 flows the commit vote from Participant 3 to Transaction Co-ordinator 2. Transaction Co-ordinator 2 flows the commit vote from Participant 3 and the commit vote from Participant 2 to Transaction Co-ordinator 1.

Transaction Co-ordinator 1 collects the commit votes from Participant 3 and Participant 2 and also the commit vote from Participant 1 but the collected votes are not hardened in the log (320). Next, Transaction Co-ordinator 1 force writes a seventh log record to the log (320) comprising the transaction identifier (T1) and a computed outcome associated with the transaction. Assuming that all participants voted commit, the decision is commit. If one or more participants vote rollback, the decision is rollback.

Next, Transaction Co-ordinator 1 flows a commit request to Participant 1 and a commit request to Transaction Co-ordinator 2. Transaction Co-ordinator 2 force writes an eighth log record to the log (335) comprising the transaction identifier (T1) and a computed outcome associated with the transaction. Next, Transaction Co-ordinator 2 flows a commit request to Participant 2 and a commit request to Transaction Co-ordinator 3. Transaction Co-ordinator 3 force writes a ninth log record to the log (350) comprising the transaction identifier (T1) and a computed outcome associated with the transaction. Next, Transaction Co-ordinator 3 flows a commit request to Participant 3.

After the transaction has been committed, the participants "forget" the transaction, resulting in the log records associated with the participants becoming eligible for purging.

As a first example, in the event that Transaction Co-ordinator 2 fails before the outcome has been communicated to at least one of: Transaction Co-ordinator 3 (and therefore Participant 3) and Participant 2, the transaction is in doubt. The transaction cannot be resolved until Transaction Co-ordinator 2 restarts. This is because Transaction Co-ordinator 3 and Participant 2 cannot communicate with Transaction Co-ordinator 1 and also may not even know about Transaction Co-ordinator 1.

As a second example, in the event that Transaction Co-ordinator 3 fails before the outcome has been communicated to Participant 3, the transaction is in doubt. The transaction cannot be resolved until Transaction Co-ordinator 3 restarts. This is because Participant 3 cannot communicate with Transaction Co-ordinator 2 or Transaction Co-ordinator 1 and also may not even know about Transaction Co-ordinator 2 or Transaction Co-ordinator 1.

Delays in transaction resolution are disadvantageous as discussed above.

The preferred embodiment will now be described in further detail with reference to publish/subscribe techniques (pub/sub). The publish/subscribe (pub/sub) architecture is a particular form of messaging. In a pub/sub system, publishers are typically not concerned with where their messages are going, and subscribers are typically not interested in where the messages they receive have come from. Instead, a message broker typically assures the integrity of the message source and manages the distribution of a message according to subscriptions registered in the message broker. Message topics typically provide the key to the delivery of messages between publishers and subscribers. The message broker attempts to match a topic string on a published message with a list of clients who have subscribed to receive publications including that topic string. In response to a match, the broker sends the published message to the subscriber.

Figure 4:
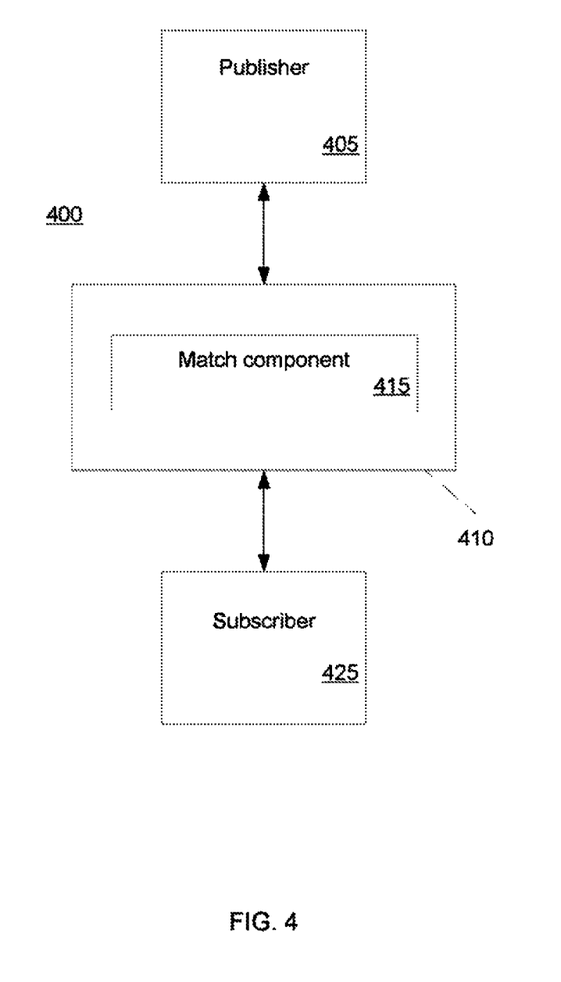
FIG. 4 is a block diagram of a publish/subscribe system.

FIG. 4 is a schematic diagram of a conventional data processing system (400), comprising a publisher (405), a broker (410) and a subscriber (425). The broker (410) includes a match component (415) for matching a topic string on a published message with subscribers that have subscribed to receive publications including that topic string.

Figure 5:
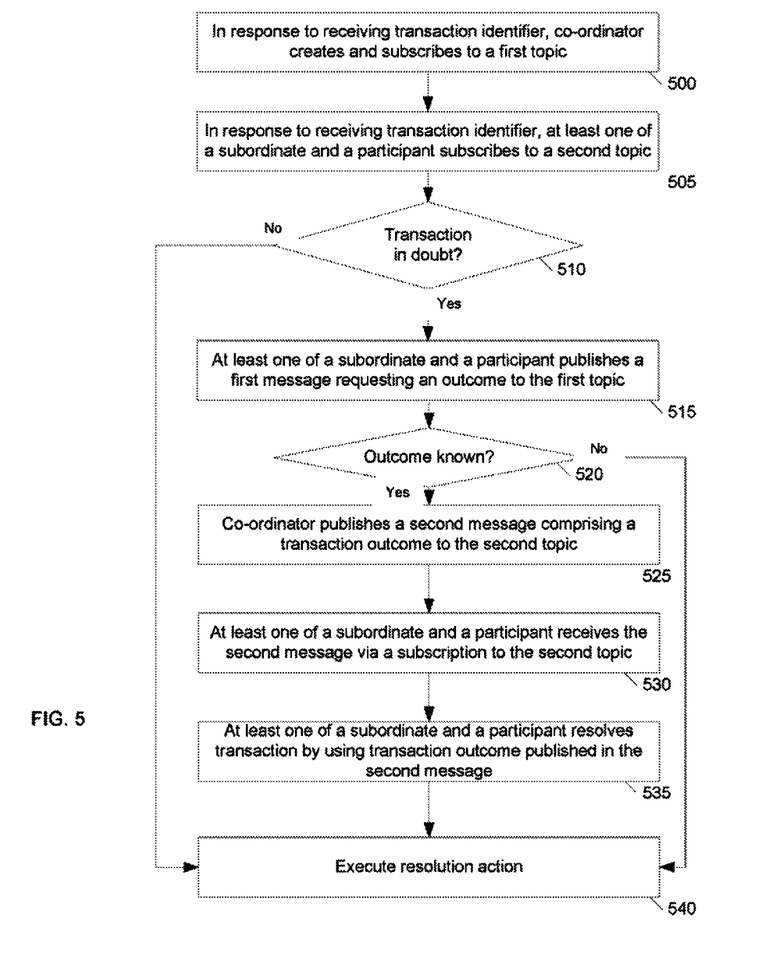
FIG. 5 is a flow chart showing the operational steps involved in a transaction resolution process involving components in the transactional system depicted in FIG. 3.

With reference to FIG. 5, in response to the generation of a transaction identifier (e.g. T2) of a transaction, Transaction Co-ordinator 1 is configurable to register (step 500) a first topic at the broker (410). Alternatively, the first topic can be created by another component. An example of a first topic is shown below:

Topic 1:

"Transaction inquiry"

Transaction Co-ordinator 1, Transaction Co-ordinator 2 and Transaction Co-ordinator 3 subscribe to the first topic.

In response to receiving the transaction identifier (T2), at least one of a subordinate and a participant are configurable to subscribe (step 505) to a second topic. An example of a second topic is shown below:

Topic 2:

"Transaction outcome"

In a third example, Transaction Co-ordinator 2, Transaction Co-ordinator 3, Participant 1, Participant 2 and Participant 3 subscribe to the second topic.

Assume Transaction Co-ordinator 1 flows a commit request to Participant 1 and Transaction Co-ordinator 2. Transaction Co-ordinator 2 then crashes. In the event of the failure associated with Transaction Co-ordinator 2, the transaction is in doubt (step 510). Participant 2 and/or Transaction Co-ordinator 3 check the transaction identifier (T2) associated with the transaction and publish (step 515) a message to the first topic. It should be understood that Participant 3 can also publish a message to the first topic, however, preferably either a surviving participant or its associated surviving subordinate performs this action in order to minimize traffic.

The message comprises the transaction identifier (T2) and a request for a transaction outcome. An example of the message is shown below:

Message:

message1 (T2; Request for outcome)

Transaction Co-ordinator 1 receives the message through its subscription to the first topic. If a transaction outcome is known (step 520), in response to receiving the message. Transaction Co-ordinator 1 inspects its log (320) in order to check for a transaction outcome. In response to finding a transaction outcome. Transaction Co-ordinator 1 publishes (step 525) a message to the second topic.

The message comprises the transaction identifier (T2) and the transaction outcome. An example of the message is shown below:

Message:

message2 (T2; Commit)

Participant 2, Transaction Co-ordinator 3 and Participant 3 receive (step 530) the message through their subscription to the second topic.

In response to receiving the message, Participant 2, Transaction Co-ordinator 3 and Participant 3 resolve (step 535) the transaction by using the transaction outcome published in the message. In the third example. Participant 2 resolves (step 535) the transaction by committing the transaction, in the third example. Transaction Co-ordinator 3 resolves (step 535) the transaction by flowing a commit request to Participant 3. In the third example, Participant 3 resolves (step 535) the transaction by committing the transaction. It should be understood that if both Transaction Coordinator 3 and Participants resolve the transaction (e.g. a commit operation occurs twice), only one commit operation succeeds and the extra commit operation is ignored.

It should be understood that, alternatively, either a surviving subordinate (e.g. Transaction Co-ordinator 3) or its associated surviving participant (e.g. Participant 3) receives a message comprising a transaction outcome. Advantageously, this reduces traffic. Furthermore, tins results in transaction resolution occurring only once (i.e. only Transaction Co-ordinator 3 or Participant 3 control transaction resolution (e.g. a commit operation occurs once).

If a transaction outcome is not known (step 520), at least one of a subordinate and a participant remain in doubt. Preferably, one or more prior art transaction resolution actions are executed (step 540). For example, manual intervention is executed. In another example, at least one of: a subordinate and a participant wait (e.g. for a pre-determined time threshold) for a transaction outcome message.

Advantageously, the preferred embodiment alleviates delays in transaction resolution. Furthermore, advantageously, the use of pub/sub means the components do not have to know about each other.

In a fourth example, in response to the generation of a transaction identifier (e.g. T3) of a transaction, Transaction Co-ordinator 1 is configurable to register (step 500) a first topic at the broker (410). An example of a topic is shown below:

Topic 1:
"Transaction inquiry"

Transaction Co-ordinator 1, Transaction Co-ordinator 2 and Transaction Co-ordinator 3 subscribe to the first topic.

In response to receiving the transaction identifier (T3), at least one of a subordinate and a participant are configurable to subscribe (step 505) to the second topic. An example of a second topic is shown below:

Topic 2:
"Transaction outcome"

In the fourth example, Transaction Co-ordinator 2, Transaction Co-ordinator 3, Participant 1, Participant 2 and Participant 3 subscribe to the second topic.

In the fourth example, Transaction Co-ordinator 1 flows a commit request to Participant 1 and Transaction Co-ordinator 2. Transaction Co-ordinator 2 then flows a commit request to Participant 2 and Transaction Co-ordinator 3. Transaction Co-ordinator 3 then crashes.

In the event of the failure associated with Transaction Co-ordinator 3, the transaction is in doubt (step 510). Participant 3 checks the transaction identifier (T3) associated with the transaction and publishes (step 515) a message to the first topic.

The message comprises the transaction identifier (T3) and a request for a transaction outcome. An example of the message is shown below:

Message:
messages (T3; Request for outcome)

Transaction Co-ordinator 1 and Transaction Co-ordinator 2 receive the message through their subscription to the first topic.

If a transaction outcome is known (step 520), in response to receiving the message, Transaction Co-ordinator 1 and Transaction Co-ordinator 2 inspect their logs (320 and 335 respectively) in order to check for a transaction outcome. In response to finding a transaction outcome, Transaction Co-ordinator 1 and Transaction Co-ordinator 2 publish (step 525) messages to the second topic. Alternatively, only one of Transaction Co-ordinator 1 and Transaction Co-ordinator 2 is selected to publish (step 525) a message to the second topic in order to minimize traffic.

The message comprises the transaction identifier (T3) and the transaction outcome. An example of the message is shown below:

Message:
message4 (T3; Commit)

Participant 3 receives (step 530) the message through its subscription to the second topic.

In response to receiving the message, Participant 3 resolves (step 535) the transaction by using the transaction outcome published in the message. In the fourth example. Participant 3 resolves (step 535) the transaction by committing the transaction.

If a transaction outcome is not known (step 520), at least one of a subordinate and a participant remain in doubt. Preferably, one or more prior art transaction resolution actions are executed (step 540).

A second embodiment will now be described with reference to a messaging system.

The asynchronous transfer of messages between application programs running different data processing systems within a network is well known in the art, and is implemented by a number of commercially available messaging systems. A sender application program issues a put message command to send a message to a target queue. A queue manager program handles the complexities of transferring the message from the sender to the target queue, which may be remotely located across a heterogeneous computer network. The target queue is a local input queue for another application program, which retrieves the message from this input queue by issuing a get message command asynchronously from the send operation. The receiver application program then performs its processing on the message, and may generate further messages.

Messaging can be transactional or non-transactional. A thread of operations that are executed in a transaction can either be done (i.e. "committed") or undone (i.e. "backed out"). When a thread of operations is part way through, the transaction is known as "inflight", so that if it abnormally terminates, the queue manager program can detect this and can back-out updates made by an owning application. The sequence of operations may then be re-tried from the beginning by another application, in two-phase commit protocols, when the transaction is "in doubt", the queue manager program is unable to determine whether the transaction should be committed or backed out as the transaction must be co-ordinated by a transaction co-ordinator.

It is known in messaging systems, to allow messages to be processed by any of a plurality of queue manager programs. A shared queue is provided to store incoming messages so that they can be retrieved by a queue manager program having available capacity to process the messages. A queue manager program having available capacity retrieves the queued message, performs the necessary processing and places an appropriate response back on the shared queue. Thus, the shared queue stores messages sent in either direction between queue manager programs that perform the processing. Advantageously, automatic workload sharing and processing redundancy is provided by this arrangement.

Figure 6:
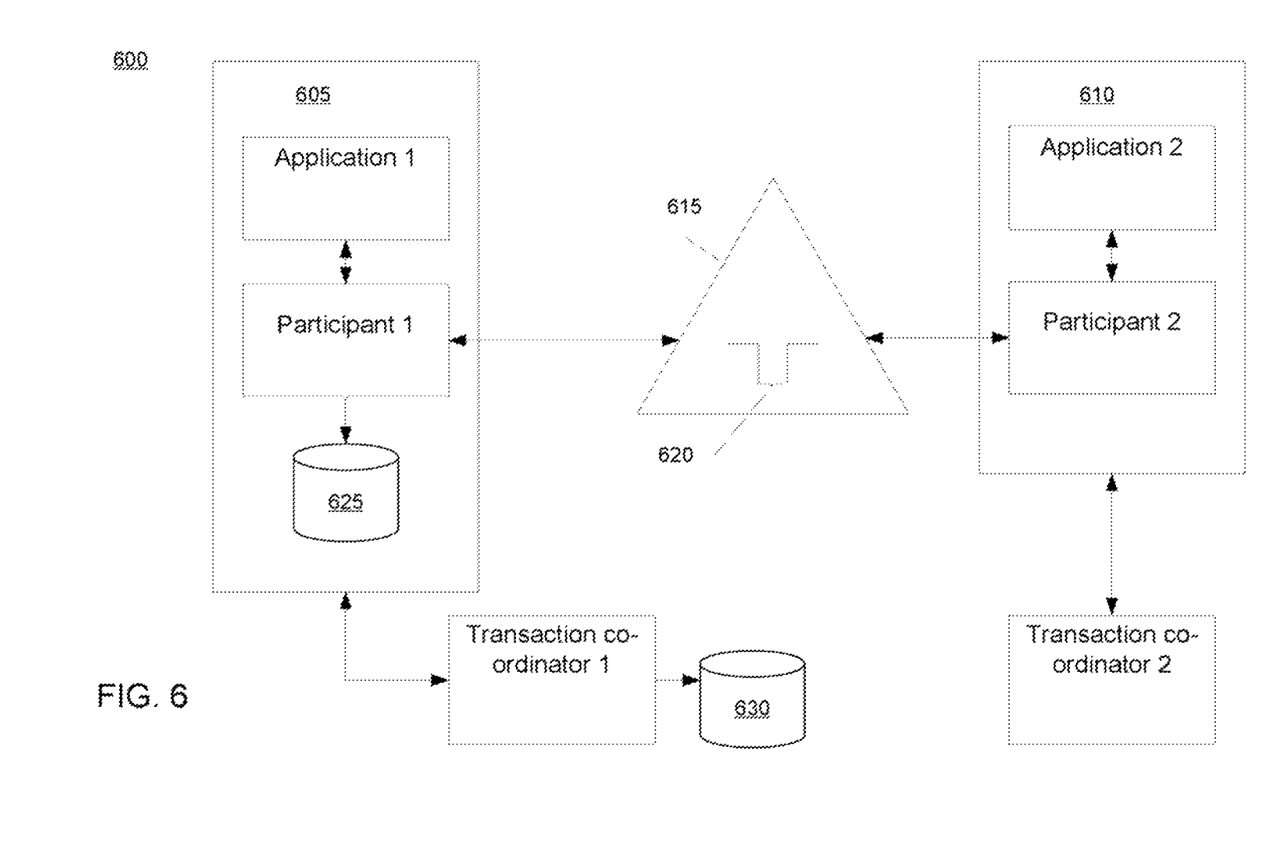
FIG. 6 is a block diagram of a transactional system according to a second embodiment.

FIG. 6 depicts such a system (600), where there is shown a data processing system (605) comprising Application 1 that issues put/get message commands via a queue manager program (i.e. Participant 1) to a shared queue (620) within a coupling facility (615). Participant 1 is associated with a resource (i.e. the shared queue (620)). Participant 1 has an associated log (625).

Application 2 running on a data processing system (610), issues put/get message commands via a queue manager program (i.e. Participant 2) to the shared queue (620). Participants 1 and 2 are associated with each other and are known as "peers" as disclosed for example in U.S. Pat. No. 6,842,763.

In a preferred embodiment the messaging system is also transactional and transactions are co-ordinated by Transaction co-ordinator 1 having an associated log (630). Transaction co-ordinator 1 is associated with Application 1 and Participant 1.

Transaction co-ordinator 2 is associated with Application 2 and Participant 2. Transaction co-ordinator 1 and Transaction co-ordinator 2 are known as peers. Transaction co-ordinator 1 has access to Transaction co-ordinator 2's log (not shown) and Transaction co-ordinator 2 has access to Transaction coordinator 1's log (630).

Firstly, Application 1 flows a begin request to Transaction co-ordinator 1 which indicates the start of a transaction. Next, Application 1 sends an update request to Participant 1. In response to receiving the update request, Participant 1 registers as a participant in the transaction with Transaction co-ordinator 1 and receives a transaction identifier (e.g. T4) of the transaction in response.

In response to Participant 1 successfully performing the update request, Application 1 sends a commit request to Transaction co-ordinator 1. Application 1 does not regain control until commit processing completes.

In response to the commit request from Application 1, Transaction co-ordinator 1 force writes a first log record to its log (630), wherein the first log record comprises the identifier associated with the transaction (T4) and an identifier associated with Participant 1.

Next once the forced log write completes (guaranteeing the data is stored in non-volatile storage), Transaction co-ordinator 1 flows a prepare request to Participant 1. In response to receiving the prepare request; Participant 1 force writes a second log record to its log (630), wherein the second log record comprises the transaction identifier (14) received in response to the prepare request and a state associated with the transaction, namely, "in doubt". This state indicates that Participant 1 can no longer assume rollback but needs to wait to be informed of a transaction, outcome.

Next, Participant 1 flows a commit vote (i.e. a response to the prepare request) to Transaction co-ordinator 1, indicating that Participant 1 can successfully participate in the transaction. It should be understood, that if Participant 1 cannot successfully participate in the transaction, it should back out any updates it performed and vote rollback without writing a log record.

Transaction co-ordinator 1 collects the commit vote from Participant 1 but the collected vote is not hardened in the log (630). Next, Transaction co-ordinator 1 force writes a third log record to the log (630) comprising the transaction identifier (T4) and a computed outcome associated with the transaction. Assuming that all participants voted commit, the decision is commit. If one or more participants vote rollback, the decision is rollback.

Next, Transaction co-ordinator 1 flows a commit request to Participant 1. Alter, the transaction has been committed, participants "forget" the transaction, resulting in the log records associated with the participants becoming eligible for purging.

If a peer fails, in the prior art, peer recovery is known, as disclosed for example in U.S. Pat. No. 6,842,763. In peer recovery, if Participant 1 (termed herein as a "failed peer") fails. Participant 2 (termed herein as a "surviving peer") receives notification of the failure. Participant 2 then begins peer recovery, which takes place in two phases. In a first phase, recovery of transactions that have passed beyond the in-flight state occurs (e.g. by committing or backing out). In the first phase, transactions in the in-doubt state are identified. In a second phase, recovery of in-flight transactions occurs (e.g. by backing out).

In a fifth example, in the event that Participant 1 fails before an outcome has been communicated to it, the transaction is in doubt and any messages on the shared queue associated with the transaction are locked. It should be understood that peer recovery cannot be carried out on any transaction in the in-doubt state.

One prior art solution is to wait until the failed peer (e.g. Participant 1) restarts. Upon restart, the peer contacts the transaction co-ordinator in order to determine a transaction outcome. The transaction is then resolved by the peer (i.e. Participant 1) (e.g. by committing or backing out the transaction). It should be understood that re-start of the failed peer can take time and thus cause delay.

Alternatively, manual intervention can be carried out (this is also know as "heuristic resolution"). This may be required if the failed peer cannot be re-started for example. In an example manual intervention process, an administrator queries a surviving peer (e.g. Participant 2) in order to determine whether any transactions were identified as having an in-doubt state. The administrator also identifies the transaction co-ordinator associated with any in-doubt transaction. In response to identifying the transaction co-ordinator, the administrator queries the transaction co-ordinator in order to determine a transaction outcome (i.e. commit or back-out). In response to determining a transaction outcome, the administrator issues a command to the surviving peer (i.e. Participant 2) to resolve the transaction (i.e. to commit or back-out the transaction).

It should be understood that heuristic resolution can be a complex and error prone process. Furthermore, it may be very difficult and time consuming for an administrator to contact a surviving peer and/or transaction co-ordinator. Furthermore, delays in transaction resolution are disadvantageous as discussed above.

Figure 7:
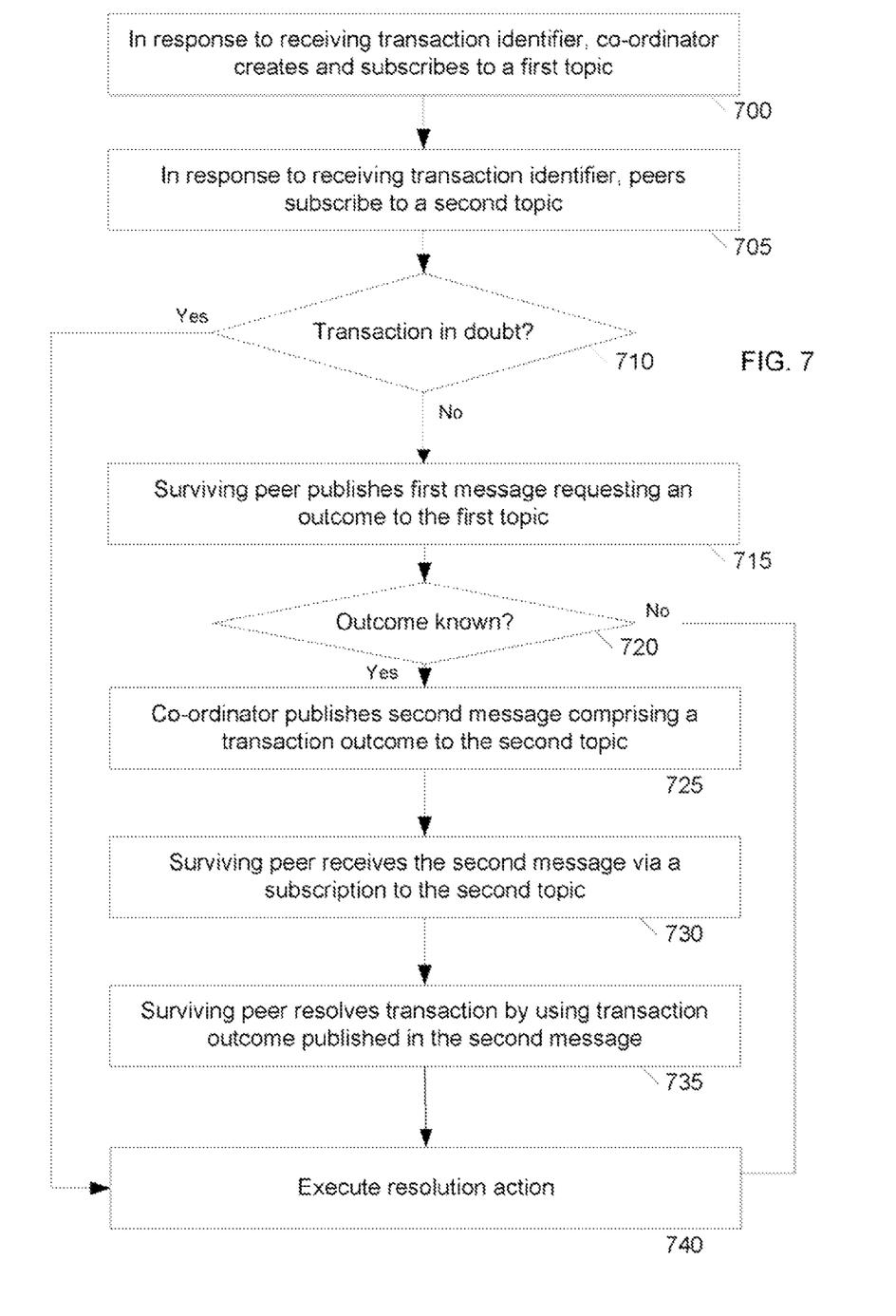
FIG. 7 is a flow chart showing the operational steps involved in a transaction resolution process involving components in the transactional system depicted in FIG. 6.

With reference to FIGS. 4, 6 and 7, in a sixth example, in response to the generation of a transaction identifier (e.g. T5) of a transaction, Transaction co-ordinator 1 is configurable to register (step 700) a first topic at the broker (410). An example of a first topic is shown below:

Topic 1:

"Transaction inquiry"

Transaction co-ordinator 1 and Transaction co-ordinator 2 subscribe to the first topic.

In response to receiving the transaction identifier (T5), a peer is configurable to subscribe (step 705) to a second topic. An example of a second topic is shown below:

Topic 2:

"Transaction outcome"

In the sixth example, Participant 1 and Participant 2 subscribe to the second topic. Participant 1 sends a commit vote to Transaction co-ordinator 1. Participant 1 then crashes. The transaction is therefore in doubt.

In the event of the failure associated with Participant 1, Participant 2 determines whether it can perform peer recovery. As described above, peer recovery cannot be performed for in doubt transactions. In response to determining that peer recovery can be performed (and therefore the transaction is not in doubt (step 710), Participant 2 performs peer recovery and resolves (step 735) the transaction (e.g. by committing or backing out the transaction).

In the sixth example, the transaction is in doubt (step 710) and therefore Participant 2 determines that it cannot perform peer recovery. In response to determining that peer recovery cannot be performed, Participant 2 checks the transaction identifier (i.e. T5) associated with the trails action and publishes (step 715) a message to the first topic.

The message comprises the transaction identifier (T5) and a request for a transaction outcome. An example of the message is shown below:
Message:
message5 (T5; Request for outcome)

Transaction co-ordinator 1 receives the message through its subscription to the first topic. If a transaction outcome is known (step 720), in response to receiving the message. Transaction co-ordinator 1 inspects its log (630) in order to check for a transaction outcome. In response to finding a transaction outcome. Transaction co-ordinator 1 publishes (step 725) a message to the second topic.

The message comprises the transaction identifier (T5) and the transaction outcome. An example of the message is shown below:
Message:
message6 (T5; Commit)

Participant 2 receives (step 730) the message through its subscription to the second topic.

In response to receiving the message, Participant 2, performs peer recovery and resolves (step 735) the transaction. In the sixth example, Participant 2 resolves (step 735) the transaction by committing the transaction.

If a transaction outcome is not known (step 720), one or more prior art transaction resolution actions are executed (step 740).

In a seventh example, in response to the generation of a transaction identifier (e.g. T6) of a transaction, Transaction co-ordinator 1 is configurable to register (step 700) a first topic at the broker (410). An example of a first topic is shown below:
Topic 1:
"Transaction inquiry"

Transaction co-ordinator 1 and Transaction co-ordinator 2 subscribe to the first topic.

In response to receiving the transaction identifier (T6), a peer is configurable to subscribe (step 705) to a second topic. An example of a second topic is shown below:
Topic 2:
"Transaction outcome"

In the seventh example. Participant 1 and Participant 2 subscribe to the second topic. Participant 1 sends a commit vote to Transaction co-ordinator 1, Participant 1 then crashes. Transaction co-ordinator 1 also crashes. The transaction is therefore in doubt.

In the event of the failure associated with Participant 1, Participant 2 determines whether it can perform peer recovery. As described above, peer recovery cannot be performed for in doubt transactions. In response to determining that peer recovery can be performed (and therefore the transaction is not in doubt (step 710)), Participant 2 performs peer recovery and resolves (step 735) the transaction (e.g. by committing or backing out the transaction).

The transaction is in doubt (step 710) and therefore Participant 2 determines that it cannot perform peer recovery. In response to determining that peer recovery cannot be performed. Participant 2 checks the transaction identifier (T6) associated with the transaction and publishes (step 715) a message to the first topic.

The message comprises the transaction identifier (T6) and a request for a transaction outcome. An example of the message is shown below:
Message:
message7 (T6; Request for outcome)

Transaction co-ordinator 2 receives the message through its subscription to the first topic. If a transaction outcome is known (step 720), in response to receiving the message, Transaction co-ordinator 2 inspects Transaction co-ordinator 1's log (630) in order to check for a transaction outcome. In response to finding a transaction outcome, Transaction co-ordinator 2 publishes (step 725) a message to the second topic.

The message comprises the transaction identifier (T6) and the transaction outcome. An example of the message is shown below:
Message:
message8 (T6; Commit)

Participant 2 receives (step 730) the message through its subscription to the second topic. In response to receiving the message. Participant 2, performs peer recovery and resolves (step 735) the transaction. In the seventh example. Participant 2 resolves (step 735) the transaction by committing the transaction.

If a transaction outcome is not known (step 720), one or more prior art transaction resolution actions are executed (step 740).

While preferred embodiments have been described above, it should be understood that the scope of the invention is not limited to the embodiments described but shall also include all variations and modifications that will occur to those skilled in the art.

The invention claimed is:

1. A method, comprising:
   establishing subscriptions via a publish and subscribe protocol to a first topic by a plurality of transaction participants that use a transaction protocol for coordinated peer transactions and by at least one component with access to transaction outcomes of the transaction protocol associated with a unit of work produced by the plurality of transaction participants via the transaction protocol;
   creating a parent unit of recovery comprising data changes associated with a transaction;
   creating in association with a first transaction participant a first child unit of recovery from the parent unit of recovery;
   causing the first child unit of recovery to be stored in a first protected database; creating in association with a second transaction participant a second child unit of recovery from the parent unit of recovery;
   causing the second child unit of recovery to be stored in a second protected database;
   publishing, by the at least one component with the access to the transaction outcomes of the transaction protocol, a first message comprising a first transaction outcome of the transaction protocol associated with the unit of work to the first topic via the publish and subscribe protocol; and
   in response to a failure associated with the first transaction participant to complete a portion of the transaction via the transaction protocol, causing the second transaction participant to use the published first transaction outcome to recover the unit of work and causing the first child unit of recovery to be stored in the second protected database.

2. The method of claim 1, further comprising: publishing, by the second transaction participant via the publish and subscribe protocol, a second message comprising a request for the first transaction outcome.

3. The method of claim 2, further comprising, in response to determining that the first message has not been published, causing the second transaction participant to re-publish the second message.

4. The method of claim 1, where the unit of work comprises a cascaded unit of work, where the plurality of transaction participants comprises a first transaction subordinate co-ordinator and where the at least one component with the access to the transaction outcomes of the transaction protocol comprises at least one of a top level transaction co-ordinator and a second subordinate transaction co-ordinator of the transaction protocol.

5. The method of claim 4, further comprising selecting one of the top level transaction co-ordinator and the second subordinate transaction co-ordinator to publish the first message via the publish and subscribe protocol.

6. The method of claim 1, where the first transaction participant and the second transaction participant are peers, and where the at least one component with the access to the transaction outcomes of the transaction protocol comprises at least one of a first transaction co-ordinator associated with the first transaction participant and a second transaction co-ordinator associated with the second transaction participant.

7. The method of claim 6, where the first transaction co-ordinator and the second transaction co-ordinator are peers.

8. A system, comprising:
a memory;
a first data processing system comprising a transaction coordinator, the first data processing system programmed to:
receive a transaction comprising a unit of work via a transaction protocol;
send a first subscription topic to a message broker via a publish and subscribe protocol; and
in response to receiving a request message from the message broker via the publish and subscribe protocol, send an outcome message to the message broker via the publish and subscribe protocol, the outcome message comprising a second subscription topic and a transaction outcome of the transaction;
a second data processing system comprising a first protected database, the second data processing system programmed to send the second subscription topic to the message broker via the publish and subscribe protocol; and
a third data processing system comprising a second protected database, the third data processing system programmed to:
send the second subscription topic to the message broker via the publish and subscribe protocol;
in response to a failure of the second data processing system to complete the transaction protocol, send the request message to the message broker via the publish and subscribe protocol, the request message comprising the first subscription topic and a request for the transaction outcome of the transaction;
receive the outcome message from the message broker via the publish and subscribe protocol; and
resolve the transaction by committing data updates to the second protected database via the transaction protocol; and
where the first data processing system is further programmed to:
create a parent unit of recovery comprising data changes associated with the transaction;
create a first child unit of recovery from the parent unit of recovery; cause the first child unit of recovery to be stored in the first protected database;
create a second child unit of recovery from the parent unit of recovery;
cause the second child unit of recovery to be stored in the second protected database; and
in response to the failure of the second data processing system to complete the transaction protocol, cause the first child unit of recovery to be stored in the second protected database.

9. The system of claim 8, where the third data processing system is further programmed to, in response to the failure of the second data processing system to complete the transaction protocol, implement a two phase commit protocol in which the third data processing system flows a commit request to the second protected database and in which the data changes associated with the transaction are either all committed or all backed out.

10. The system of claim 9, where the first, the second and the third data processing system are coupled in a cascaded system, where the second data processing system is subordinate to the first data processing system, and the third data processing system is subordinate to the second data processing system.

11. The system of claim 8, where the third data processing system is further programmed to, in response to the failure of the second data processing system to complete the transaction protocol, implement a two phase commit protocol in which the third data processing system flows a commit request to the second protected database and in which data changes associated with the transaction are either all committed or all backed out.

12. The system of claim 11, where the first, the second and the third data processing system are coupled in a cascaded system, where the second data processing system is subordinate to the first data processing system, and the third data processing system is subordinate to the second data processing system.

13. The system of claim 8, where the first, the second and the third data processing system are coupled in a cascaded system, where the second data processing system is subordinate to the first data processing system, and the third data processing system is subordinate to the second data processing system.

14. A method, comprising:
receiving, at a first data processing system, a transaction comprising a unit of work via a transaction protocol, the first data processing system comprising a transaction coordinator that coordinates the transaction via the transaction protocol;
receiving at a message broker, a first subscription to a first topic from the first data processing system via a publish and subscribe protocol;
receiving at the message broker, a second subscription to a second topic from a second and a third data processing system via the publish and subscribe protocol, the second data processing system comprising a first protected database and the third data processing system comprising a second protected database, where the second data processing system and the third data processing system comprise participants of the transaction that participate in the transaction via the transaction protocol as coordinated by the transaction coordinator of the first data processing system;
in response to a failure of the second data processing system to complete the transaction protocol, the third data processing system publishing a request message to the message broker via the publish and subscribe protocol, the request message comprising the first topic and a request for a transaction outcome of the transaction coordinated via the transaction protocol;

in response to receiving the request message from the message broker, the first data processing system publishing an outcome message to the message broker via the publish and subscribe protocol, the outcome message comprising the second topic and the transaction outcome of the transaction coordinated via the transaction protocol;

in response to receiving the outcome message from the message broker via the publish and subscribe protocol, the third data processing system resolving the transaction by committing data updates to the second protected database via the transaction protocol;

creating a parent unit of recovery comprising data changes associated with the transaction;

creating a first child unit of recovery from the parent unit of recovery;

storing the first child unit of recovery to the first protected database;

creating a second child unit of recovery from the parent unit of recovery;

storing the second child unit of recovery to the second protected database; and in response to the failure of the second data processing system to complete the transaction protocol, updating the second protected database to include the first child unit of recovery.

15. The method of claim 14 where, in response to the failure of the second data processing system to complete the transaction protocol, the third data processing system implements a two phase commit protocol in which the third data processing system flows a commit request to the second protected database and in which the data changes associated with the transaction are either all committed or all backed out.

16. The method of claim 15, where the first, the second and the third data processing system are coupled in a cascaded transactional system, where the second data processing system is subordinate to the first data processing system, and the third data processing system is subordinate to the second data processing system within the cascaded transactional system.

17. The method of claim 14 where, in response to the failure of the second data processing system to complete the transaction protocol, the third data processing system implements a two phase commit protocol in which the third data processing system flows a commit request to the second protected database and in which data changes associated with the transaction are either all committed or all backed out.

18. The method of claim 17, where the first, the second and the third data processing system are coupled in a cascaded transactional system, where the second data processing system is subordinate to the first data processing system, and the third data processing system is subordinate to the second data processing system within the cascaded transactional system.

19. The method of claim 14, where the first, the second and the third data processing system are coupled in a cascaded transactional system, where the second data processing system is subordinate to the first data processing system, and the third data processing system is subordinate to the second data processing system within the cascaded transactional system.

20. An apparatus, comprising:
a first protected database;
a second protected database; and
a processor of a first data processing system operatively coupled to the first protected database, the first data processing system programmed to:
receive a first subscription to a first topic from a second data processing system via a publish and subscribe protocol, the first topic pertaining to a transaction comprising a unit of work performed by a plurality of transaction participants and coordinated via a transaction protocol, where the second data processing system creates a parent unit of recovery comprising data changes associated with the transaction;
receive a second subscription to a second topic from a third and a fourth data processing system via the publish and subscribe protocol, where the third and fourth data processing systems comprise transaction participants of the transaction that participate in the transaction via the transaction protocol, where the third data processing system creates a first child unit of recovery stored in the first protected database from the parent unit of recovery and the fourth data processing system creates a second child unit of recovery stored in the second protected database from the parent unit of recovery;
in response to a failure of the third data processing system to complete the transaction protocol, receive a publication request message from the fourth data processing system via the publish and subscribe protocol, the publication request message comprising the first topic and a request for a transaction outcome of the transaction;
send the publication request message to the second data processing system via the publish and subscribe protocol;
receive, in response to the publication request message, a transaction outcome message comprising the transaction outcome of the transaction from the second data processing system via the publish and subscribe protocol; and
send the transaction outcome message to the fourth data processing system via the publish and subscribe protocol, the transaction outcome message for use by the fourth data processing system in resolving the transaction via the transaction protocol using the transaction outcome, where the fourth data processing system causes the first child unit of recovery to be stored in the second protected database.

21. A computer program product comprising a non-transitory computer readable storage medium having computer readable program code embodied therewith, where the computer readable program code when executed on a computer causes the computer to:
receive a first subscription to a first topic from a first data processing system via a publish and subscribe protocol, the first topic pertaining to a transaction comprising a unit of work performed by a plurality of transaction participants via a transaction protocol, where the first data processing system creates a parent unit of recovery comprising data changes associated with the transaction;
receive a second subscription to a second topic from a second and a third data processing system via the publish and subscribe protocol, where the second and third data processing systems comprise transaction participants of the transaction that participate in the transaction via the transaction protocol, where the second data processing system creates a first child unit of recovery stored in a first protected database from the parent unit of recovery and the third data processing system creates a second child unit of recovery stored in a second protected database from the parent unit of recovery;

in response to a failure of the second data processing system to complete the transaction protocol, receive a publication request message from the third data processing system via the publish and subscribe protocol, the publication request message comprising the first topic and a request for a transaction outcome of the transaction;

send the publication request message to the first data processing system via the publish and subscribe protocol;

receive, in response to the publication request message, a transaction outcome message comprising the transaction outcome of the transaction from the first data processing system via the publish and subscribe protocol; and send the transaction outcome message to the third data processing system via the publish and subscribe protocol, the transaction outcome message for use by the third data processing system in resolving the transaction via the transaction protocol using the transaction outcome, where the third data processing system causes the first child unit of recovery to be stored in the second protected database.

\* \* \* \* \*